(12) United States Patent
Procházka et al.

(10) Patent No.: US 12,455,301 B2
(45) Date of Patent: Oct. 28, 2025

(54) HALL PLATE CURRENT SENSOR HAVING STRESS COMPENSATION

(71) Applicant: Allegro MicroSystems, LLC, Manchester, NH (US)

(72) Inventors: Roman Procházka, Struharov (CZ); Juan Manuel Cesaretti, Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 171 days.

(21) Appl. No.: 18/535,157

(22) Filed: Dec. 11, 2023

(65) Prior Publication Data

US 2025/0189562 A1 Jun. 12, 2025

(51) Int. Cl.
*G01R 15/20* (2006.01)

(52) U.S. Cl.
CPC .................................. *G01R 15/202* (2013.01)

(58) Field of Classification Search
CPC .. G01R 33/07; G01R 15/202; G01R 33/0082; G01R 21/08; H01N 59/00; G01D 5/142
USPC ........................................ 324/117 H, 207.2
See application file for complete search history.

(56) References Cited

U.S. PATENT DOCUMENTS

| | | |
|---|---|---|
| 4,236,832 A | 12/1980 | Komatsu et al. |
| 4,438,347 A | 3/1984 | Gehring |
| 4,490,674 A | 12/1984 | Ito |
| 4,570,594 A | 2/1986 | Egami et al. |
| 4,752,733 A | 6/1988 | Petr et al. |
| 4,758,943 A | 7/1988 | Aström et al. |
| 4,760,285 A | 7/1988 | Nelson |
| 4,823,075 A | 4/1989 | Alley |
| 4,833,406 A | 5/1989 | Foster |
| 4,970,411 A | 11/1990 | Halg et al. |
| 5,247,278 A | 9/1993 | Pant et al. |
| 5,285,155 A | 2/1994 | Ueda et al. |
| 5,329,416 A | 7/1994 | Ushiyama et al. |
| 5,343,143 A | 8/1994 | Voisine et al. |
| 5,412,255 A | 5/1995 | Wallrafen |
| 5,424,558 A | 6/1995 | Borden et al. |
| 5,469,058 A | 11/1995 | Dunnam |
| 5,521,501 A | 5/1996 | Dettmann et al. |

(Continued)

FOREIGN PATENT DOCUMENTS

| | | |
|---|---|---|
| CN | 1501093 A | 6/2004 |
| CN | 101023367 A | 8/2007 |

(Continued)

OTHER PUBLICATIONS

U.S. Appl. No. 13/345,021, filed Jan. 6, 2012, Foletto et al.

(Continued)

*Primary Examiner* — Roberto Velez
(74) *Attorney, Agent, or Firm* — DALY, CROWLEY, MOFFORD & DURKEE, LLP

(57) ABSTRACT

Methods and apparatus for a voltage driven Hall plate current sensor integrated circuit (IC) package that includes a die including a Hall plate with a lateral epi resistor. A gm amplifier receives an output voltage from the Hall plate and a front end amplifier receives an output of the gm amplifier. A compensation circuit compensates for stress on the die that affects a resistance of the Hall plate and includes a lateral epi resistor coupled to a constant current for compensating for piezoresistive stress in the Hall plate.

21 Claims, 8 Drawing Sheets

(56) References Cited

U.S. PATENT DOCUMENTS

| | | |
|---|---|---|
| 5,614,754 A | 3/1997 | Inoue |
| 5,621,319 A | 4/1997 | Bilotti et al. |
| 5,640,090 A | 6/1997 | Furuya et al. |
| 5,652,445 A | 7/1997 | Johnson |
| 5,844,140 A | 12/1998 | Seale |
| 5,917,320 A | 6/1999 | Scheller et al. |
| 6,011,770 A | 1/2000 | Tan |
| 6,091,239 A | 7/2000 | Vig et al. |
| 6,242,908 B1 | 6/2001 | Scheller et al. |
| 6,252,395 B1 | 6/2001 | Aoyama et al. |
| 6,291,989 B1 | 9/2001 | Schroeder |
| 6,297,627 B1 | 10/2001 | Towne et al. |
| 6,351,506 B1 | 2/2002 | Lewicki |
| 6,392,478 B1 | 5/2002 | Mulder et al. |
| 6,436,748 B1 | 8/2002 | Forbes et al. |
| 6,437,558 B2 | 8/2002 | Li et al. |
| 6,441,460 B1 | 8/2002 | Viebach |
| 6,525,531 B2 | 2/2003 | Forrest et al. |
| 6,639,290 B1 | 10/2003 | Hohe et al. |
| 6,750,644 B1 | 6/2004 | Berkcan |
| 6,781,359 B2 | 8/2004 | Stauth et al. |
| 6,853,178 B2 | 2/2005 | Hayat-Dawoodi |
| 6,896,407 B2 | 5/2005 | Nomiyama et al. |
| 6,917,321 B1 | 7/2005 | Haurie et al. |
| 7,033,071 B2 | 4/2006 | Otsuka |
| 7,036,029 B2 | 4/2006 | May et al. |
| 7,038,448 B2 | 5/2006 | Schott et al. |
| 7,184,876 B2 | 2/2007 | Teulings et al. |
| 7,190,784 B2 | 3/2007 | Li |
| 7,199,579 B2 | 4/2007 | Scheller et al. |
| 7,259,545 B2 | 8/2007 | Stauth et al. |
| 7,265,531 B2 | 9/2007 | Stauth et al. |
| 7,292,095 B2 | 11/2007 | Burt et al. |
| 7,319,319 B2 | 1/2008 | Jones et al. |
| 7,323,870 B2 | 1/2008 | Tatschl et al. |
| 7,325,175 B2 | 1/2008 | Momtaz |
| 7,339,245 B2 | 3/2008 | Mueller |
| 7,345,470 B2 | 3/2008 | Suzuki |
| 7,368,904 B2 | 5/2008 | Scheller et al. |
| 7,425,821 B2 | 9/2008 | Monreal et al. |
| 7,474,093 B2 | 1/2009 | Ausserlechner |
| 7,518,354 B2 | 4/2009 | Stauth et al. |
| 7,598,601 B2 | 10/2009 | Taylor et al. |
| 7,605,647 B1 | 10/2009 | Romero et al. |
| 7,635,993 B2 | 12/2009 | Boeve |
| 7,694,200 B2 | 4/2010 | Forrest et al. |
| 7,701,208 B2 | 4/2010 | Nishikawa |
| 7,729,675 B2 | 6/2010 | Krone |
| 7,746,056 B2 | 6/2010 | Stauth et al. |
| 7,746,065 B2 | 6/2010 | Pastre et al. |
| 7,764,118 B2 | 7/2010 | Kusuda et al. |
| 7,769,110 B2 | 8/2010 | Momtaz |
| 7,800,389 B2 | 9/2010 | Friedrich et al. |
| 7,872,322 B2 | 1/2011 | Schott et al. |
| 7,923,996 B2 | 4/2011 | Doogue et al. |
| 7,923,997 B2 | 4/2011 | Utsuno |
| 7,936,144 B2 | 5/2011 | Vig et al. |
| 7,961,823 B2 | 6/2011 | Kolze et al. |
| 7,990,209 B2 | 8/2011 | Romero |
| 8,030,918 B2 | 10/2011 | Pastre et al. |
| 8,128,549 B2 | 3/2012 | Testani et al. |
| 8,134,358 B2 | 3/2012 | Charlier et al. |
| 8,203,329 B2 | 6/2012 | Hohe et al. |
| 8,350,563 B2 | 1/2013 | Haas et al. |
| 8,357,983 B1 | 1/2013 | Wang |
| 8,447,556 B2 | 5/2013 | Friedrich et al. |
| 8,542,010 B2 | 9/2013 | Cesaretti et al. |
| 8,598,867 B2 | 12/2013 | Foletto et al. |
| 8,680,846 B2 | 3/2014 | Cesaretti et al. |
| 8,723,512 B1 | 5/2014 | Burdette et al. |
| 8,736,260 B2 | 5/2014 | Foletto et al. |
| 8,742,846 B1* | 6/2014 | Everton .............. H03F 3/45089 |
| | | 330/254 |
| 8,749,005 B1 | 6/2014 | Foletto et al. |
| 9,052,349 B2 | 6/2015 | Haas et al. |
| 9,151,807 B2 | 10/2015 | Friedrich et al. |
| 9,201,122 B2 | 12/2015 | Cesaretti et al. |
| 9,638,764 B2 | 5/2017 | Cesaretti et al. |
| 9,644,999 B2 | 5/2017 | Foletto et al. |
| 9,841,485 B2 | 12/2017 | Petrie et al. |
| 9,851,417 B2 | 12/2017 | Kosier et al. |
| 10,066,965 B2 | 9/2018 | Foletto et al. |
| 10,107,873 B2 | 10/2018 | Cesaretti |
| 10,162,017 B2 | 12/2018 | Cesaretti |
| 10,254,354 B2 | 4/2019 | Cesaretti |
| 10,466,298 B2 | 11/2019 | Chaware et al. |
| 10,520,559 B2 | 12/2019 | Cesaretti et al. |
| 10,636,285 B2 | 4/2020 | Haas et al. |
| 10,746,817 B2 | 8/2020 | Kosier et al. |
| 10,746,818 B2 | 8/2020 | Cesaretti |
| 10,908,232 B2 | 2/2021 | Latham et al. |
| 11,169,223 B2 | 11/2021 | Ostermann et al. |
| 11,402,280 B2 | 8/2022 | Cesaretti et al. |
| 2002/0084923 A1 | 7/2002 | Li |
| 2003/0038675 A1 | 2/2003 | Gailus et al. |
| 2003/0102909 A1 | 6/2003 | Motz |
| 2006/0202692 A1 | 9/2006 | Tatschl et al. |
| 2006/0224350 A1 | 10/2006 | Tanizawa |
| 2006/0261801 A1 | 11/2006 | Busch |
| 2007/0110199 A1 | 5/2007 | Momtaz et al. |
| 2007/0164732 A1 | 7/2007 | Voisine et al. |
| 2007/0222433 A1 | 9/2007 | Tiernan et al. |
| 2007/0247141 A1 | 10/2007 | Pastre et al. |
| 2007/0285089 A1 | 12/2007 | Ibuki et al. |
| 2008/0074106 A1 | 3/2008 | Oohira |
| 2008/0094055 A1 | 4/2008 | Monreal et al. |
| 2008/0110987 A1 | 5/2008 | Cato et al. |
| 2008/0137784 A1 | 6/2008 | Krone |
| 2008/0238410 A1 | 10/2008 | Charlier et al. |
| 2008/0265880 A1 | 10/2008 | Nishikawa |
| 2009/0001964 A1 | 1/2009 | Strzalkowski |
| 2009/0001972 A1 | 1/2009 | Fernandez et al. |
| 2009/0085706 A1 | 4/2009 | Baarman et al. |
| 2009/0108839 A1 | 4/2009 | Ausserlechner |
| 2009/0146647 A1 | 6/2009 | Ausserlechner |
| 2009/0206827 A1 | 8/2009 | Aimuta et al. |
| 2009/0206829 A1 | 8/2009 | Kamiya et al. |
| 2009/0212765 A1 | 8/2009 | Doogue et al. |
| 2010/0072988 A1 | 3/2010 | Hammerschmidt et al. |
| 2010/0117638 A1 | 5/2010 | Yamashita et al. |
| 2010/0211347 A1 | 8/2010 | Friedrich et al. |
| 2011/0018533 A1 | 1/2011 | Cesaretti et al. |
| 2011/0048102 A1 | 3/2011 | Fernandez et al. |
| 2011/0119015 A1 | 5/2011 | Hirobe et al. |
| 2011/0298448 A1 | 12/2011 | Foletto et al. |
| 2011/0298450 A1 | 12/2011 | Foletto et al. |
| 2012/0007589 A1 | 1/2012 | Okada |
| 2012/0016614 A1 | 1/2012 | Hohe et al. |
| 2012/0112695 A1 | 5/2012 | Nishi et al. |
| 2012/0249126 A1 | 10/2012 | Friedrich et al. |
| 2012/0274314 A1 | 11/2012 | Cesaretti et al. |
| 2012/0313635 A1 | 12/2012 | Daubert |
| 2013/0093412 A1 | 4/2013 | Anelli et al. |
| 2013/0285651 A1 | 10/2013 | Wan et al. |
| 2014/0009221 A1 | 1/2014 | Motz et al. |
| 2014/0062463 A1 | 3/2014 | Foletto et al. |
| 2014/0222364 A1 | 8/2014 | Foletto et al. |
| 2014/0266176 A1 | 9/2014 | Fernandez et al. |
| 2015/0028871 A1 | 1/2015 | Suijver et al. |
| 2015/0142342 A1 | 5/2015 | Huber et al. |
| 2016/0245880 A1 | 8/2016 | Ausserlechner |
| 2017/0030280 A1 | 2/2017 | Kosier et al. |
| 2017/0234910 A1* | 8/2017 | Nakamura .......... G01R 19/0092 |
| | | 324/251 |
| 2018/0017637 A1* | 1/2018 | Cesaretti ................ G01R 33/07 |
| 2019/0049529 A1 | 2/2019 | Cesaretti et al. |
| 2021/0048353 A1* | 2/2021 | Cesaretti ............ G01R 33/0082 |
| 2021/0389386 A1 | 12/2021 | Hikichi et al. |

FOREIGN PATENT DOCUMENTS

| | | |
|---|---|---|
| CN | 2009-86484 Y | 12/2007 |
| DE | 195 39 458 A1 | 4/1997 |
| DE | 196 06 826 A1 | 8/1997 |

(56) References Cited

FOREIGN PATENT DOCUMENTS

| | | |
|---|---|---|
| DE | 101 39 149 A1 | 2/2003 |
| DE | 10 2005 047 413 A1 | 9/2006 |
| DE | 10 2006 037 226 A | 2/2008 |
| DE | 10 2007 041 230 B3 | 4/2009 |
| EP | 0 024 836 A1 | 3/1981 |
| EP | 0 289 414 A2 | 11/1988 |
| EP | 0 338 122 A1 | 10/1989 |
| EP | 0 357 013 A2 | 3/1990 |
| EP | 0 456 302 A2 | 11/1991 |
| EP | 0 456 392 A2 | 11/1991 |
| EP | 0 504 583 A1 | 9/1999 |
| EP | 1 637 898 A1 | 3/2006 |
| EP | 1 679 524 A1 | 7/2006 |
| EP | 1 850 143 A1 | 10/2007 |
| GB | 2 276 727 A | 10/1994 |
| JP | S 61-48777 A | 3/1986 |
| JP | H 03-176682 A | 7/1991 |
| JP | H 03-248611 A | 11/1991 |
| JP | H 04-40007 A | 2/1992 |
| JP | H 11-257993 | 9/1999 |
| JP | 2000-055999 A | 2/2000 |
| JP | 2000-258162 A | 9/2000 |
| JP | 2001-153745 A | 6/2001 |
| JP | 2002-213992 A | 7/2002 |
| JP | 2003-315770 A | 11/2003 |
| JP | 2004-177228 A | 6/2004 |
| JP | 2004-234589 A | 8/2004 |
| JP | 2004-245804 A | 9/2004 |
| JP | 2004-279324 A | 10/2004 |
| JP | 2006-123012 A | 5/2006 |
| JP | 2006-126012 A | 5/2006 |
| JP | 2006-284375 A | 10/2006 |
| JP | 2008-513762 A | 5/2008 |
| JP | 2008-256415 A | 10/2008 |
| JP | 2008-309626 A | 12/2008 |
| JP | 2009-281881 A | 12/2009 |
| JP | 2010-500536 A | 1/2010 |
| JP | 2011-052036 A | 3/2011 |
| JP | 4840481 B2 | 12/2011 |
| KR | 10-2007-0060096 | 6/2007 |
| TW | 2006-40135 A | 11/2006 |
| WO | WO 96/02849 A1 | 2/1996 |
| WO | WO 2004/079385 A1 | 9/2004 |
| WO | WO 2006/035342 A1 | 4/2006 |
| WO | WO 2006/056289 A1 | 6/2006 |
| WO | WO 2007/000746 A2 | 1/2007 |
| WO | WO 2007/138508 A1 | 12/2007 |
| WO | WO 2008/048379 A1 | 4/2008 |
| WO | WO 2008/123144 A1 | 10/2008 |
| WO | WO 2009/108422 A2 | 9/2009 |
| WO | WO 2009/154157 A1 | 12/2009 |
| WO | WO 2010/010811 A1 | 1/2010 |
| WO | WO 2010/096367 A1 | 8/2010 |
| WO | WO 2013/017211 A1 | 2/2013 |

OTHER PUBLICATIONS

U.S. Appl. No. 13/526,099, filed Jun. 18, 2012, Dwyer et al.
U.S. Appl. No. 13/526,113, filed Jun. 18, 2012, Dwyer et al.
U.S. Appl. No. 13/685,287, filed Nov. 26, 2012, Burdette et al.
U.S. Appl. No. 13/752,681, filed Jan. 29, 2013, Wang.
U.S. Appl. No. 13/833,847, filed May 15, 2013, Fernandez et al.
U.S. Appl. No. 14/452,823, filed Aug. 6, 2014, Fernandez et al.
U.S. Appl. No. 14/681,575, filed Apr. 8, 2015, Cesaretti et al.
U.S. Appl. No. 15/066,331, filed Mar. 10, 2016, Cesaretti.
U.S. Appl. No. 15/207,903, filed Jul. 12, 2016, Cesaretti.
U.S. Appl. No. 18/152,189, filed Jan. 10, 2023, Romero.
U.S. Appl. No. 18/458,441, filed Aug. 30, 2023, Daigle et al.
U.S. Appl. No. 18/458,509, filed Aug. 30, 2023, Romero.
Ackermann et al.; "New Generation of Hall-effect Based Current Sensor: Evolution from Core-based to Integrated;" M. Sc. Laurent Coulot, Melexis Technologies, A.G.Bevaix; Apr. 1, 2015; 8 pages.
Allegro Microsystems, Inc.; Data Sheet ATS673 and ATS674; Self-Calibrating TPOS Gear Tooth Sensor IC Optimized for Automotive Cam Sensing Application; Jan. 14, 2005; 20 pages.
Allegro Microsystems, Inc.; Data Sheet ATS675LSE; Self-Calibrating TPOS Speed Sensor IC Optimized for Automotive Cam Sensing Applications; Jul. 14, 2008; 13 pages.
Allegro Microsystems, Inc.; Design Intent Data Sheet; A1340; "High Precision, Highly Programmable Linear Hall Effect Sensor IC with EEPROM and Analog Output with Advanced Output Linearization Capabilities;" Sep. 10, 2009; 40 Pages.
Allegro Microsystems, Inc.; Design Intent Data Sheet; A1341; "High Precision, Highly Programmable Linear Hall Effect Sensor IC with EEPROM, Output Protocols SENT and PWM, and Advanced Output Linearization Capabilities;" May 17, 2010; 46 Pages.
Allegro MicroSystems, LLC, "Automotive, Programmable Stepper Driver;" Datasheet A3981; Jan. 2013; 43 pages.
Ausserlechner et al., "Compensation of the Piezo-Hall Effect in Integrated Hall Sensors on (100)-Si;" Proceedings of the 2007 IEEE Sensors Journal, vol. 7, No. 11; Nov. 2007; 8 Pages.
Ausserlechner et al., "Drift of Magnetic Sensitivity of Smart Hall Sensors Due to Moisture Absorbed by the IC-Package;" Proceedings of the 2004 IEEE Sensors; Oct. 2004; 4 Pages.
Ausserlechner; "Limits of Offset Cancellation by the Principle of Spinning Current Hall Probe;" Proceedings of IEEE Sensors; Oct. 2004; pp. 1117-1120; 4 pages.
Ausserlechner; "The piezo-Hall effect in n-silicon for arbitrary crystal orientation;" Proceedings of IEEE Sensors; vol. 3; Oct. 24, 2004; ISBN: 0-7803-8692-2; pp. 1149-1152; 4 pages.
Bahreyni, et al.; "A Resonant Micromachined Magnetic Field Sensor;" IEEE Sensors Journal; vol. 7, No. 9, Sep. 2007; 9 Pages.
Baltes et al., "Integrated Semiconductor Magnetic Field Sensors;" Proceedings of the 1986 IEEE, vol. 74, Issue 3; Aug. 1986; 28 Pages.
Barrettino, et al.; "CMOS-Based Monolithic Controllers for Smart Sensors Comprising Micromembranes and Microcantilevers;" IEEE Transactions on Circuits and Systems—I Regular Papers vol. 54, No. 1; Jan. 2007; 12 Pages.
Baschirotto et al.; "Development and Analysis of PCB Vector 2-D Magnetic Field Sensor System for Electronic Compass;" IEEE Sensors Journal vol. 6, No. 2; Apr. 2006; 7 Pages.
Bilotti et al.; "Monolithic Magnetic Hall Sensor Using Dynamic Quadrature Offset Cancellation;" IEEE Journal of Solid-State Circuits; vol. 32, Issue 6; Jun. 1997; 8 Pages.
Blagojevic et al.; "FD SOI Hall Sensor Electronics Interfaces for Energy Measurement;" Microelectronics Journal 37; Sep. 2006; pp. 1576-1583; 8 pages.
Cesaretti et al.; "Effect of Stress Due to Plastic Package Moisture Absorption in Hall Sensors;" IEEE Transactions on Magnets; vol. 45; No. 10; Oct. 2009; pp. 4482-4485; 4 pages.
Demierre, et al.; "Reference Magnetic Actuator for Self-Calibration of a Very Small Hall Sensor Array;" Sensors and Actuators A97-98; Apr. 2002; 8 Pages.
Fischer et al., "Analyzing Parameters Influencing Stress and Drift in Moulded Hall Sensors;" Proceedings of the 2006 IEE Electronics Systemintegration Technology Conference, Dresden, Germany; Sep. 2006; 8 Pages.
Frick, et al.; "CMOS Microsystem for AC Current Measurement with Galvanic Isolation;" IEEE Sensors Journal; vol. 3, No. 6; Dec. 2003; 9 Pages.
Grubbs, "Hall Effect Devices;" Article from Bell System Technical Journal, vol. 38, Issue 3; 24 Pages.
Halg; "Piezo-Hall Coefficients of n-Type Silicon;" Journal of Applied Physics; vol. 64, No. 1; Jul. 1, 1988; 7 Pages.
Hosticka; "CMOS Sensor Systems;" Sensors and Actuators A66; Apr. 1998; 7 Pages.
Huber, et al.; "A Fully Integrated Analog Compensation for the Piezo-Hall Effect in a CMOS Single-Chip Hall Sensor Microsystem"; IEEE Sensors Journal; vol. 15; No. 5; May 2015; 10 Pages.
Huber et al.; "Package Stress Monitor to Compensate for the Piezo-Hall Effect in CMOS Hall Sensors;" 2012 IEEE Sensors; Oct. 2012; 4 pages.
Huber et al.; "Package Stress Monitor to Compensate for the Piezo-Hall Effect in CMOS Hall Sensors;" IEEE Sensors Journal, vol. 13, No. 8; Aug. 2013; pp. 2890-2898; 9 pages.

(56) References Cited

OTHER PUBLICATIONS

Kanda; "A Graphical Representation of the Piezoresistance Coefficients in Silocon;" IEEE Transactions on Electron Devices; vol. Ed-29, vol. 1; Jan. 1982; pp. 64-70; 7 pages.

Kanda et al.; "The Piezo-Hall Effect in n-Silicon;" $22^{nd}$ International Conference on the Physics of Semiconductors; vol. 1, Jan. 1995; 4 Pages.

Kaufmann et al., "Novel Coupling Concept for Five-Contact Vertical Hall Devices;" Proceedings of the 2011 IEEE Transducers Conference; Jun. 2011; 4 Pages.

Kayal et al.; "Automatic Calibration of Hall Sensor Microsystems;" Microelectronics Journal 37; Sep. 2006; pp. 1569-1575; 7 Pages.

Krammerer et al.: "A Hall effect sensors network insensitive to mechanical stress;" Proceedings of IEEE Sensors; vol. 3, Oct. 2004; 4 Pages.

Magnani et al., "Mechanical Stress Measurement Electronics Based on Piezo-Resistive and Piezo-Hall Effects;" Proceedings of the 2002 $9^{th}$ International Conference on Electronics, Circuits and Systems; Jan. 2002; 4 Pages.

Manic et al.; "Short and Long-Term Stability Problems of Hall Plates in Plastic Packages;" IEEE $38^{th}$ Annual International Reliability Physics Symposium; Apr. 2000; 6 Pages.

Manic, "Drift in Silicon Integrated Sensors and Circuits Due to the Thermo-Mechanical Stresses;" Lausanne, Ecole Polytechnique Federale De Lausanne 2000; 176 Pages.

Melexis MLX 90324; "Under-the-Hood" Triaxis Rotary Position feat. SENT Protocol; 3901090324 Data Sheet; Dec. 2008; 40 pages.

Motz et al., "An Integrated Magnetic Sensor with Two Continuous-Time Converters and Stress Compensation Capability;" Proceedings of the 2006 IEEE International Solid-State Circuits Conference; Feb. 2006; 7 Pages.

Motz, et al.; "A Chopped Hall Sensor with Small Jitter and Programmable "True Power-On" Function;" IEEE Journal of Solid-State Circuits; vol. 40, No. 7; Jul. 2005; 8 Pages.

Motz et al.; "A Miniature Digital Current Sensor with Differential Hall Probes Using Enhanced Chopping Techniques and Mechanical Stress Compensation;" IEEE Sensors; Oct. 2012; 4 pages.

Motz, et al.; "An Integrated Hall Sensor Platform Design for Position, Angle and Current Sensing;" IEEE Sensors 2006; Exco, Daegu, Korea / Oct. 22-25, 2006; 4 Pages.

Munter; "A Low-offset Spinning-current Hall Plate;" Sensors and Actuators, vol. A21-A23; Jan. 1990; 4 Pages.

Munter; "Electronic Circuitry for a Smart Spinning-current Hall Plate with Low Offset;" Sensors and Actuators A; Jun. 1991; 5 Pages.

Partin et al.; "Temperature Stable Hall Effect Sensors;" IEEE Sensors Journal, vol. 6, No. 1; Feb. 2006; 5 Pages.

Pastre, et al.; "A Hall Sensor Analog Front End for Current Measurement with Continuous Gain Calibration;" IEEE Sensors Journal; vol. 7, No. 5; May 2007; 8 Pages.

Pastre, et al.; "A Hall Sensor-Based Current Measurement Microsystem With Continuous Gain Calibration;" Research in Microelectronics and Electronics, IEEE vol. 2; Jul. 25; 2005; ISBN: 0-7803-9345-7; 4 Pages.

Popovic; "Sensor Microsystems;" Proc. $20^{th}$ International Conference on Microelectronics (MWIL 95); vol. 2, NIS, Serbia, 12-14; Sep. 1995; 7 Pages.

Popovic, "Hall Effect Devices: Magnetic Sensors and Characterization of Semiconductors;" Excerpt from Book; $1^{st}$ Edition; CRC Press; Jan. 1991; 2 Pages.

Randhawa; "Monolithic Integrated Hall Devices in Silicon Circuits;" Microelectronics Journal; vol. 12, No. 6; Sep. 14-17, 1981; 6 Pages.

Randjelovic et al.; "Highly Sensitive Hall Magnetic Sensor Microsystems in CMOS Technology;" IEEE Journal of Solid-State Circuits, vol. 37, No. 2; Feb. 2002; pp. 151 to 159; 9 Pages.

Ruther et al., "Integrated CMOS-Based Sensor Array for Mechanical Stress Mapping;" Proceedings of the $5^{th}$ IEEE Sensors Conference; Oct. 2006; 4 Pages.

Ruther et al.; "Thermomagnetic Residual Offset in Integrated Hall Plates;" IEEE Sensors Journal; vol. 3, No. 6; Dec. 2003; 7 Pages.

Sargent; "Switched-capacitor IC controls feedback loop;" EDN; Design Ideas; Feb. 17, 2000; pp. 154 and 156; 2 pages.

Sato et al., "Influences of Molding Conditions on Die-pad Behavior in IC Encapsulation Process Analyzed by Hall Element Method;" Proceedings of the 2000 IEEE Transactions on Advanced Packaging, vol. 23, No. 3; Aug. 2000; 8 Pages.

Schneider et al.; "Temperature Calibration of CMOS Magnetic Vector Probe for Contactless Angle Measurement System;" International Electron Devices Meeting; Dec. 8-11, 1996; 4 Pages.

Schott et al., "Linearizing Integrated Hall Devices;" Proceedings of the 1997 IEEE International Conference on Solid-State Sensors and Actuators; Jun. 1997; 4 Pages.

Schott, et al.; "CMOS Single-Chip Electronic Compass with Microcontroller;" IEEE Journal of Solid-State Circuits; vol. 42, No. 12; Dec. 2007; 11 Pages.

Schweda et al.; "A Nonlinear Simulation Model for Integrated Hall Devices in CMOS Silicon Technology;" Proceedings of 2002 IEEE International Behavioral Modeling and Simulation, BMAS 2002; Oct. 6-8, 2002; 7 pages.

Simon et al.; "Autocalibration of Silicon Hall Devices;" $8^{th}$ International Conference on Solid-State Sensors and Actuators; vol. 2; Jun. 25, 1995; 4 Pages.

Steiner et al., "Double-Hall Sensor with Self-Compensated Offset;" Proceedings of the IEEE Electron Devices Meeting; Dec. 10, 1997; 4 Pages.

Steiner et al; Offset Reduction in Hall Devices by Continuous Spinning Current Method; Sensors and Actuators A66; 1998; 6 Pages.

Stellrecht et al.; Characterization of Hygroscopic Swelling Behavior of Mold Compounds and Plastic Packages; IEEE Transactions on Components and Packaging Technologies; vol. 27, No. 3; Sep. 2004; 8 Pages.

Tian et al.; "Multiple Sensors on Pulsed Eddy-Current Detection for 3-D Subsurface Crack Assessment;" IEEE Sensors Journal, vol. 5, No. 1; Feb. 2005; 7 Pages.

Trontelj et al; "CMOS Integrated Magnetic Field Source Used as a Reference in Magnetic Field Sensors on Common Substrate;" WEP 1-6; IMTC; May 1994; 3 Pages.

Van der Meer et al; "CMOS Quad-Spinning-Current Hall-Sensor System for Compass Application;" Proceedings of IEEE Sensors, vol. 3; Oct. 2004; pp. 1434-1437; 4 pages.

Wu, et al.; "A Chopper Current-Feedback Instrumentation Amplifier with a 1mHz 1/f Noise Corner and an AC-Coupled Ripple-Reduction Loop;" IEEE International Solid-State Circuits Conference; Feb. 10, 2009; pp. 322-324; 3 pages.

Zou et al.; "Three-Dimensional Die Surface Stress Measurements in Delaminated and Non-Delaminated Plastic Packages;" 48th Electronic Components and Technology Conference; May 25, 1998; 12 Pages.

U.S. Non-Final Office Action dated Mar. 10, 2022 for U.S. Appl. No. 16/538,270; 10 Pages.

Response to U.S. Non-Final Office Action dated Mar. 10, 2022 for U.S. Appl. No. 16/538,270; Response filed May 10, 2022; 11 Pages.

U.S. Notice of Allowance dated May 18, 2022 for U.S. Appl. No. 16/538,270; 10 Pages.

U.S. Non-Final Office Action dated Aug. 12, 2016 for U.S. Appl. No. 14/681,575; 27 Pages.

Response to U.S. Non-Final Office Action dated Aug. 12, 2016 for U.S. Appl. No. 14/681,575; Response filed Nov. 1, 2016; 12 Pages.

U.S. Notice of Allowance dated Feb. 17, 2017 for U.S. Appl. No. 14/681,575; 10 Pages.

PCT International Search Report and Written Opinion dated Jul. 20, 2016 for International Application No. PCT/US2016/025495; 20 Pages.

PCT International Preliminary Report on Patentability dated Oct. 19, 2017 for International Application No. PCT/US2016/025495; 16 pages.

European Communication Pursuant to Rules 161(1) and 162 EPC dated Nov. 10, 2017 for European Application No. 16716398.9; 2 Pages.

(56) References Cited

OTHER PUBLICATIONS

Response to European Communication Pursuant to Rules 161(1) and 162 EPC dated Nov. 10, 2017 for European Application No. 16716398.9; Response filed May 9, 2018; 16 Pages.
European Intention to Grant dated Sep. 14, 2018 for European Application No. 16716398.9; 7 Pages.
Motz et al., "Compensation of Mechanical Stress-Induced Drift of Bandgap References With On-Chip Stress Sensor;" IEEE Sensors Journal, vol. 15, No. 9; Sep. 2015; 7 Pages.
Extended European Search Report (EESR) dated May 12, 2025 for European Application No. 24212398.2; 10 Pages.
Response to Extended European Search Report (EESR) dated May 12, 2025 for European Application No. 24212398.2; Response Filed Aug. 27, 2025; 21 Pages.

\* cited by examiner

The effect of stress on a vertical epitaxial resistor is governed by the following formula:

$$\frac{\Delta R}{R} = 53.4\% \; \frac{1}{\text{GPa}} \; (\sigma_x + \sigma_y)$$

Vertical epitaxial resistor cross section.

HALL PLATE CURRENT SENSOR HAVING STRESS COMPENSATION

BACKGROUND

As is known in the art, Hall elements can be used for various sensing applications based on detecting magnetic field changes. A typical planar or horizontal Hall effect element is a four-terminal device for which a drive current (a DC current) is passed between two opposing ones of the four terminals and a differential voltage (AC or DC), responsive to a magnetic field (AC or DC), is generated between the other two opposing ones of the four terminals. An amplitude of the differential signal (i.e., voltage) is related to amplitude of the drive current. Thus, a sensitivity (e.g., mV per Gauss) of the differential signal corresponds to the amplitude of the drive current. Such devices can be referred to as current driver Hall plates.

In order to maintain a constant and stable sensitivity, the drive current can be generated with a stable current source or a current sink that uses a stable reference voltage. However, various parameters can cause the sensitivity to magnetic fields of the differential signal to change. In general, even with a perfectly stable drive current, the Hall effect element itself can experience sensitivity changes. The changes in sensitivity of the Hall effect element can result directly from temperature changes. In order to correct for this sensitivity change, temperature can be sensed and the changes in sensitivity with temperature can be corrected.

However, the changes in sensitivity of the differential signal can also result from stresses upon a substrate on which the Hall effect element is disposed. The stresses may or may not be related to temperature and also may or may not be related to a thermal coefficient of a material of a package used to seal the substrate. The stresses and resulting changes in sensitivity may vary from unit to unit in different ways with respect to temperature.

SUMMARY

Example embodiments of the disclosure provide methods and apparatus for a voltage-driven Hall plate sensor having stress compensation. In embodiments, stress compensation is provided by vertical and/or lateral "epi" resistors for controlling current, such as $I_{VAR}$ and $I_{CONST}$ of a Gilbert cell. In embodiments, temperature stress compensation of a voltage-drive Hall plate sensor is provided by certain current ratios and/or trimming. Voltage-driven Hall plate sensors may have lower noise and require less die area, as compared with conventional current driven Hall plate sensors.

In one aspect, a voltage driven Hall plate current sensor integrated circuit (IC) package comprises: a die including a Hall plate comprising a lateral epi resistor; a gm amplifier to receive an output voltage from the Hall plate; a front end amplifier to receive an output of the gm amplifier; and a compensation circuit to compensate for stress on the die that affects a resistance of the Hall plate, the compensation circuit including a lateral epi resistor coupled to a temperature-dependent current for compensating for piezoresistive stress in the Hall plate.

An IC package can further include one or more of the following features: a bandgap circuit to generate the temperature-dependent current for the lateral epi resistor, the lateral epi resistor is coupled to the gm amplifier, the gm amplifier comprises a Gilbert cell, a degeneration resistor coupled to terminals of the Gilbert cell, a vertical epi resistor coupled to a variable current source corresponding to a temperature sensitivity value, wherein the vertical epi resistor is configured to compensate for piezo stress sensitivity of the Hall plate, a DAC to receive and output the temperature sensitivity value, the vertical epi resistor is coupled to the gm amplifier, the DAC is coupled to a temperature dependent current, and/or a back end amplifier coupled to an output of the front end amplifier.

In another aspect, a method comprises: employing a die including a Hall plate comprising a lateral epi resistor, wherein the die forms a part of a voltage driven Hall plate current sensor integrated circuit (IC) package; connecting a gm amplifier to receive an output voltage from the Hall plate; connecting a front end amplifier to receive an output of the gm amplifier; and configuring a compensation circuit to compensate for stress on the die that affects a resistance of the Hall plate, wherein the compensation circuit includes a lateral epi resistor coupled to a first temperature dependent current source for compensating for piezoresistive stress in the Hall plate.

A method can further include one or more of the following features: a bandgap circuit to generate the temperature-dependent current for the lateral epi resistor, the lateral epi resistor is coupled to the gm amplifier, the gm amplifier comprises a Gilbert cell, a degeneration resistor coupled to terminals of the Gilbert cell, a vertical epi resistor coupled to a variable current source corresponding to a temperature sensitivity value, wherein the vertical epi resistor is configured to compensate for piezo stress sensitivity of the Hall plate, a DAC to receive and output the temperature sensitivity value, the vertical epi resistor is coupled to the gm amplifier, the DAC is coupled to a temperature dependent current, and/or a back end amplifier coupled to an output of the front end amplifier.

In a further aspect, a voltage driven Hall plate current sensor integrated circuit (IC) package, comprises: a die including a Hall plate comprising a lateral epi resistor; a Gilbert cell including a gm amplifier having inputs to receive a differential output voltage from the Hall plate, a degeneration resistor coupled to terminals of the gm amplifier; a front end amplifier to receive an output of the gm amplifier, wherein first and second feedback resistor are coupled in a feedback configuration for first and second inputs of the front end amplifier; a compensation circuit comprising: a lateral epi resistor RCONST coupled to the gm amplifier via a second current generator active device and to a temperature dependent current ICONST for compensating for piezoresistive stress in the Hall plate; a vertical epi resistor RVAR coupled to the gm amplifier via a first current generator active device and to a DAC configured to receive a temperature sensitivity value; a first reference resistor connected to the first current generator active device via a first amplifier and configured to receive a bandgap temperature dependent current from a bandgap circuit; and a first reference resistor connected to the DAC and to a current source configured to provide a DAC temperature dependent current, wherein an output of the DAC is coupled to the vertical epi resistor RVAR via a first amplifier.

An IC package can further include one or more of the following features: the first and second reference resistors are matched for a same temperature, the degeneration resistor and the first and second feedback resistors are a same type, the degeneration resistor and the first and second feedback resistors are matched to achieve a same temperature, a bandgap circuit to provide the temperature dependent current to the DAC, a temperature coefficient of the Gilbert cell is trimmed using a constant $k_{Iptat\_denom}$ for coarse signal path trimming, and/or the temperature coefficient of the Gilbert cell is finely trimmed by the temperature sensitivity value at the input of the DAC.

BRIEF DESCRIPTION OF DRAWINGS

The foregoing features of this disclosure, as well as the disclosure itself, may be more fully understood from the following description of the drawings in which.

DETAILED DESCRIPTION

Figure 1:
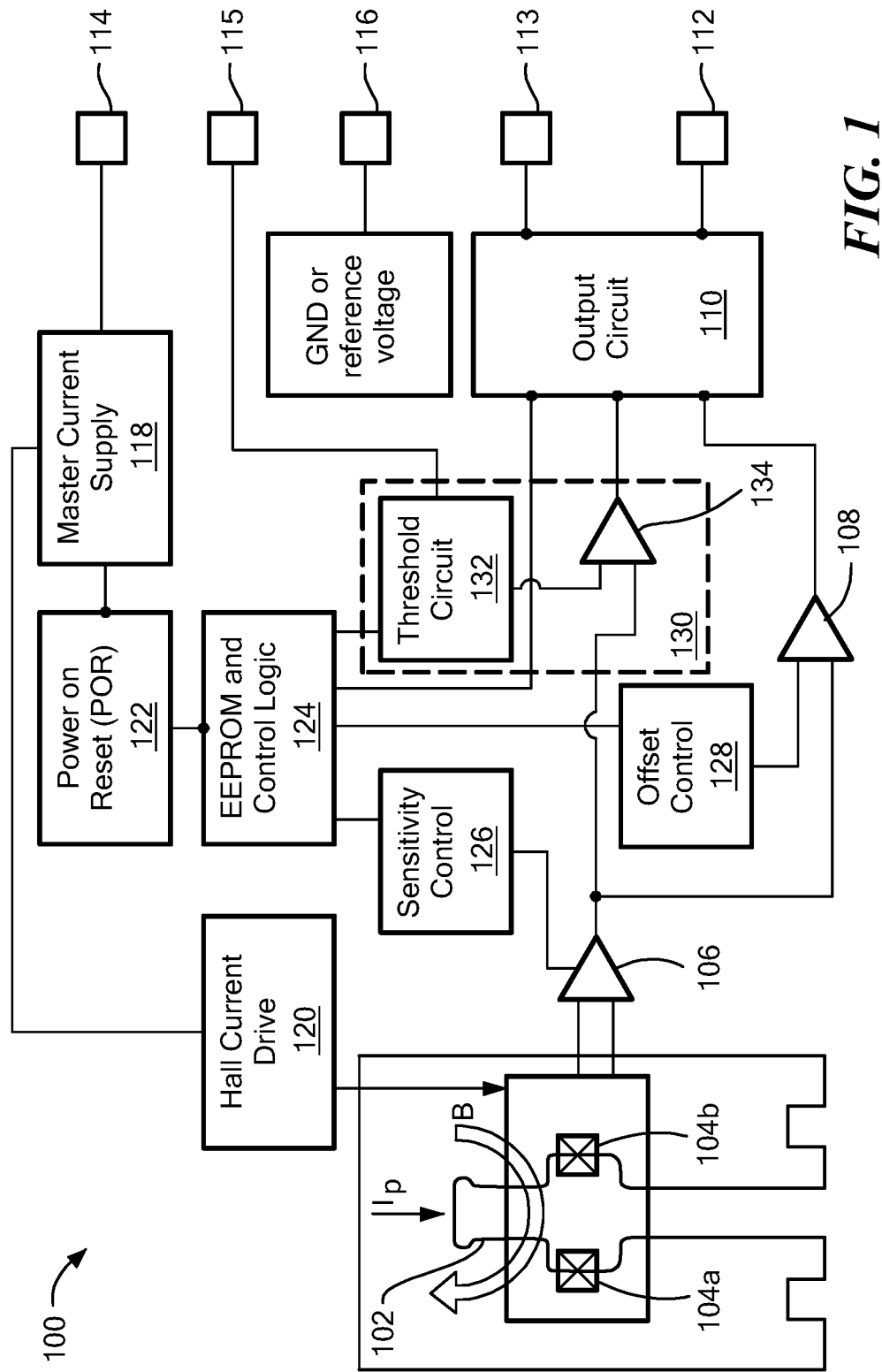
FIG. 1 is a schematic representation of an example voltage driven current sensor having stress compensation in accordance with example embodiments of the disclosure.

FIG. 1 shows an example circuit block diagram for a voltage driven Hall plate current sensor integrated circuit 100 having stress compensation in accordance with example embodiments of the disclosure. A current $I_p$ flows through a current conductor loop 102 and generates a magnetic field that can be sensed by first and second magnetic field sensing elements 104a,b, such as Hall effect plates for example. The magnetic field results in the Hall effect plates 104a,b providing a signal to a front-end amplifier 106. The front-end amplifier 106 provides an output to amplifier 108, which may be a linear amplifier, which feeds into an output circuit 110. Output circuit 110 may be a digital or analog circuit that provides an output to at least one bond pad 112. The output represents the magnetic field measured and amplified through the amplifier 108. Other numbers of output bond pads more than two may also be provided.

Bond pad 114 provides a voltage and current input, typically Vcc, to provide power to the integrated circuit 100. A ground bond pad 116 may be provided to integrated circuit 100. Input bond pad 114 is coupled to a master current supply circuit 118 that provides power to the circuitry within integrated circuit 100. Although master current supply 118 is provided as a current supply, it would be apparent that voltages may also be provided to the circuits on integrated circuit 100. A Hall effect current drive circuit 120 takes current (or voltage) from the master current supply 118 and provides a regulated or non-regulated voltage to the Hall Effect sensing elements 104a,b. The master current supply 118 also provides control signal to a power on reset circuit 122. The power on reset circuit monitors the power supply voltage coming into the circuit 100 and provides a signal to EEPROM and control logic circuit 124. The power on reset circuit 122 and EEPROM and control logic circuit 124 are used to configure and enable the integrated circuit, including the output circuit 110.

The EEPROM and control circuit 124 provides a signal to a sensitivity control circuit 126 which provides a signal to the front end amplifier 106 to adjust the sensitivity of the front end amplifier. The adjustment may be the result of a change in the power level in the circuit 100, or as a result of a temperature change of the circuit. An example of a temperature sensor circuit may include but is not limited to a diode temperature sensor, or the use of known temperature compensation resistors.

The EEPROM and control circuit 124 provides a signal to an offset control circuit 128. The offset control circuit 128 provides a signal to the amplifier 108. The offset control circuit 128 allows the circuit 100 to adjust the offset of the amplifier 108 for changes in power or temperature (the temperature compensation circuit is not shown) or a combination of temperature and power changes. The offset control circuit 128 may also provide adjustment for other offset sources, such as a stress in the integrated circuit die.

An input lead 115 may be provided to set a threshold for a fault indication circuit 130 (i.e., provide a fault trip level). In an embodiment, the input lead 115 provides a fault voltage level. The fault indication circuit 130 can include a threshold circuit 132 and a fault comparator 134. The EEPROM and control circuit 124 provides an input to the threshold circuit 132. The threshold circuit 132 provides a signal to the fault comparator 134, which compares the output of threshold circuit 132 with the output of the front end amplifier 106 to indicate when a fault exists to the output circuit block 110. The output circuit generates a fault output at output bond pad 113. The fault output may indicate an overcurrent condition in which the current sensed in the current conductor path exceeds a fault trip level, which trip level may be provided in the form of a fault voltage level on bond pad 115. The fault allows, in one example, the user of the current sensor package to turn off the current in the primary current path in order to prevent a high current condition in an electrical circuit.

It is understood that any of the above-described processing may be implemented in hardware, firmware, software, or a combination thereof. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

It is known that many Hall plate sensors are current driven and use conventional current-drive stress compensation techniques. Conventional current driven Hall plate sensors have disadvantages, such as the need for voltage margin for the current source driving the Hall plate, relatively high noise levels, and the need for relatively large amounts of die area, such as for current mirrors.

Figure 2:
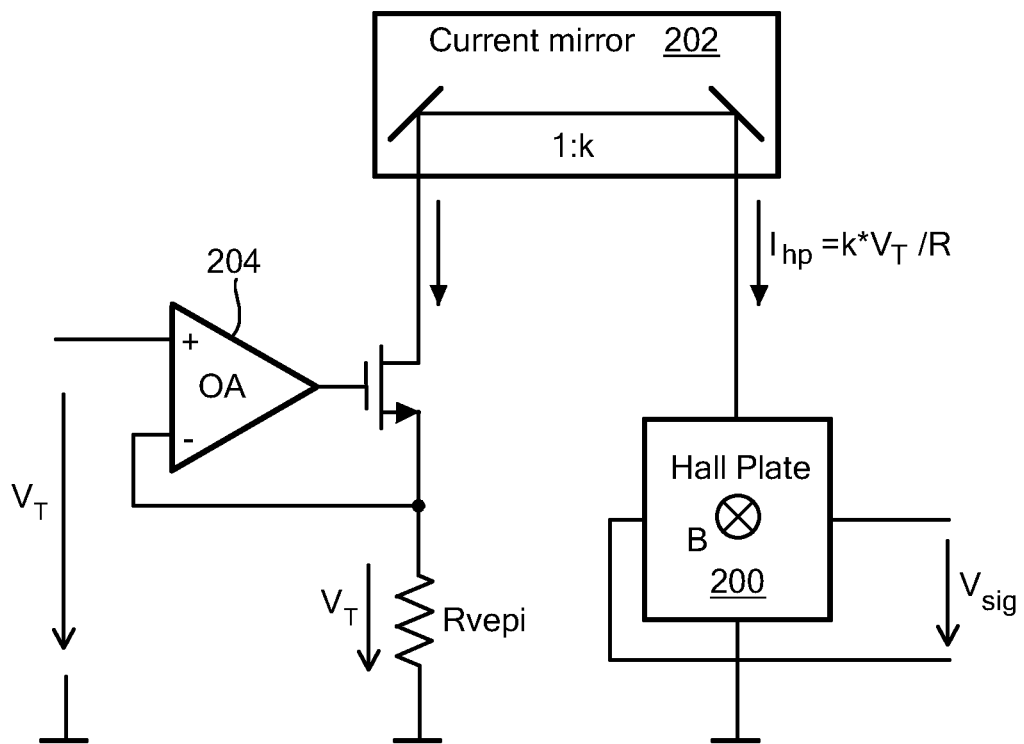
FIG. 2 is a circuit diagram of an example prior art current driven current sensor having stress compensation.

FIG. 2 shows a portion of a circuit for a prior art current-driven Hall plate sensor. A Hall plate 200 generates an output signal Vsig in response to applied magnetic field B. A current mirror 202 is used for current driving of the Hall plate 200. An amplifier 204 is used for temperature compensation of the Hall plate 200. The Hall plate 200 output can be defined as:

$$V_{sig} = B \cdot S_I \cdot I_{hp} = B \cdot k \cdot V_T \cdot \frac{S_I}{R}$$

where

B is a magnetic field perpendicular to HP surface;

$S_I$ is the current driven Hall Plate sensitivity;
$I_{hp}$ is the Hall Plate drive current;
R is the resistance of a Rvepi resistor compensating HP stress sensitivity; and
$V_T$=func(T) . . . is used for sensitivity temperature compensation.

It is known that for current driven Hall plate sensors, sensitivity SI changes with stress:

$$\frac{\Delta SI}{SI} = 45\%/Gpa$$

The Rvepi resistor can be used for current driven Hall plate sensitivity compensation as follows:

$$\frac{\Delta R_{vepi}}{R_{vepi}} = 53.4\%/Gpa$$

Remaining channel stress sensitivity with current driven Hall plate sensors after stress compensation by $R_{vepi}$:

$$\frac{\Delta SI}{SI} - \frac{\Delta R_{vepi}}{R_{vepi}} = 45\% - 53.4\% = -8.4\%/GPa$$

However, $R_{vepi}$ has a strong positive temperature compensation so channel sensitivity $S=V_T/R_{vepi}$ has strong negative temperature compensation. In view of this, a temperature dependent $V_T$ may be used for coarse temperature compensation of $R_{vepi}$ and current driven Hall plate sensors. Fine temperature compensation is usually performed by a segment processor based on temperature sensor reading.

Figure 3:
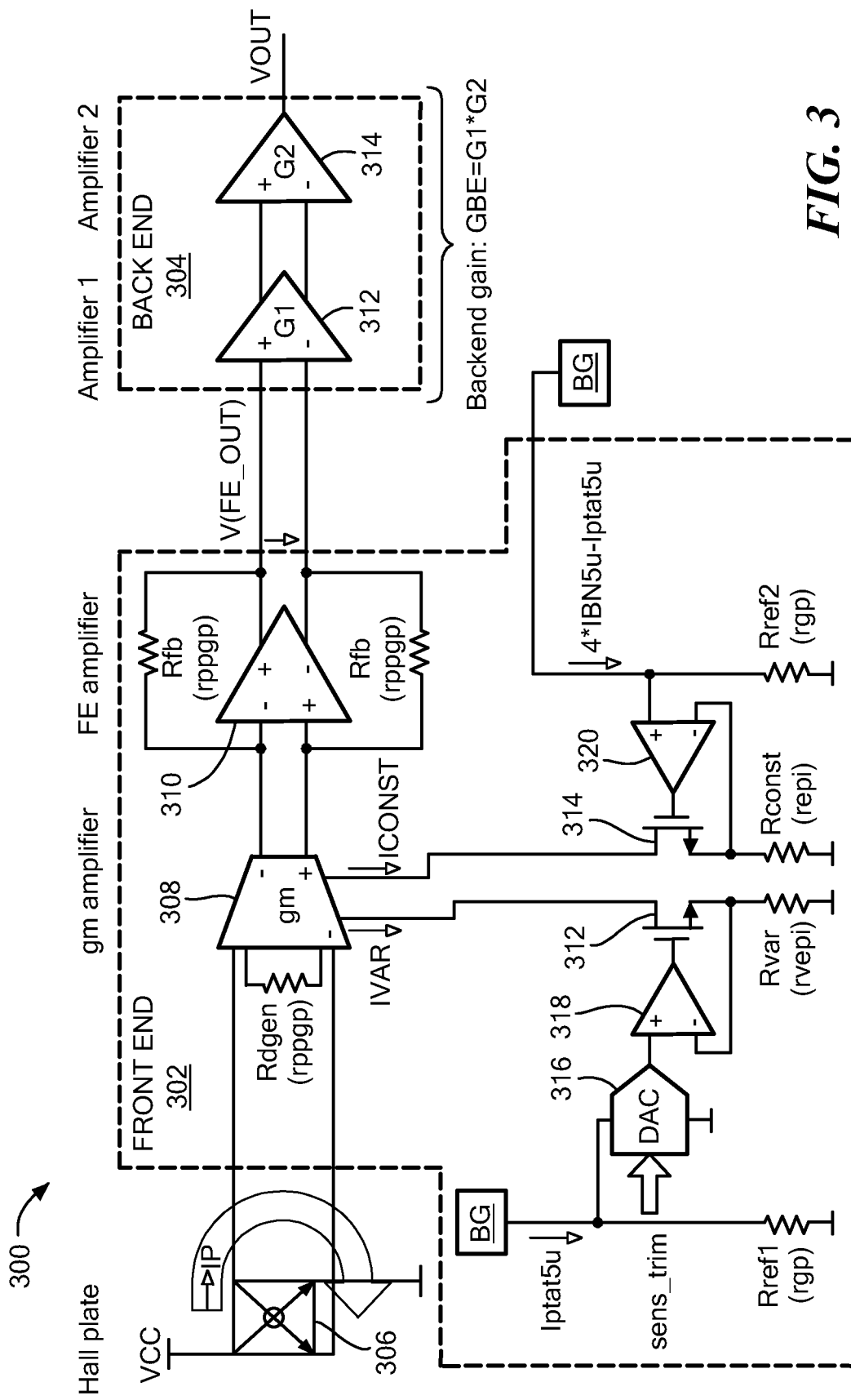
FIG. 3 is a circuit diagram of an example voltage driven current sensor having stress compensation in accordance with example embodiments of the disclosure.

FIG. 3 shows an example circuit implementation 300 of stress compensation for a voltage driven Hall plate in a current sensor having a front end module 302 and a backend module 304. The front end module 302 includes a voltage driven Hall plate 306 with differential outputs coupled to inputs of a gm amplifier (e.g., transconductance amplifier $g_m=i_{out}/v_{in}$) 308, which may comprise a Gilbert cell in example embodiments, which provides an output to a front end amplifier 310. In the illustrated embodiment, first and second amplifiers 312, 314 in the backend module 304 provide gain (GBE=G1*G2) for the output of the front end amplifier 310 output. In the illustrated embodiment, feedback resistors Rfb(rppgp) are coupled in a feedback configuration of the front end amplifier 310 for the differential signal connection, as shown. It is understood that rppgp refers to a type of resistor.

In example embodiments, current sensor sensitivity can be expressed as $$\text{Sensitivity} = \frac{V_{out}}{IP},$$

where the output voltage is Vout and IP in the figures is a current loop forming a magnetic field which creates a voltage $V_{HP}$ cross the Hall Plate.

The Gilbert cell 308, which includes a degeneration resistor Rdgen(rppgp) thereacross, inputs a first current IVAR coupled to a first terminal, e.g., drain, of a first current generator active device output 312 and a second current ICONST coupled to a first terminal, e.g., drain, of a second current generator active device output 314, as a gm defined below:

$$gm = \frac{I_{var}}{I_{const}} \cdot \frac{1}{R_{dgen(rppgp)}}$$

The circuit includes a bandgap circuit BG to provide a temperature independent voltage reference which is used to generate a constant temperature independent current $I_{BN5u}$ and current proportional to absolute temperature Iptat5u. In the bandgap circuit BG, a voltage difference between first and second diodes operated at different current densities generates a current that is proportional to absolute temperature (PTAT) on a resistor. This current is used to generate a voltage in a second resistor. This voltage in turn is added to the voltage of one of the junctions. It is understood that any suitable bandgap circuit can be used to meet the needs of a particular application.

In the illustrated circuit current Iptat5u, which is provided to a digital-to-analog converter (DAC) 316, flows through resistor Rref1(rgp) to ground. The DAC 316 receives a sensitivity trimming digital word and outputs an analog signal to a first of an amplifier 318. A second terminal, e.g., source, of the first current generator active device 312, which is coupled to ground via resistor Rvar(rvepi), is connected to a second input of the amplifier 318. The output of the amplifier 318 is coupled to a third terminal, e.g., gate, of the first current generator active device 312.

In the illustrated circuit current 4*IBN5u–Iptat5u, which is described more fully below, may be generated by the bandgap circuit BG, flows through resistor Rref2(rgp) to ground and is coupled to a first input of amplifier 320. A second terminal, e.g., source, of the second switch 314, which is coupled to ground via resistor Rconst(repi), is connected to a second input of the amplifier 318. The output of the amplifier 320 is coupled to a third terminal, e.g., gate, of the second current generator active device 314.

For the illustrated embodiment, stress compensation for the voltage driven Hall plate 306 is based on vertical and lateral epi resistors Rvar(rvepi), Rconst(repi) controlling IVAR and ICONST currents of the Gilbert Cell 308. While current ICONST may be constant for a given temperature, current ICONST varies over temperature. It is understood that stress on die can affect the Hall plate resistance Rhp (epi), which comprises a lateral epi resistor. Another lateral epi resistor Rconst(repi) can compensate for stress on the Hall plate, however, it may be desirable to provide temperature compensation for the Hall plate stress compensation. Stress compensation of the voltage driven Hall plate may include sensitivity temperature compensation using current Iptat/(4*Iflat–Iptat) with temperature compensation trimming input to the DAC 316.

Sensitivity of the sensor can be defined as:

$$\text{sensitivity} = S_{HP} * I_{hall} * IVAR * \frac{1}{ICONST} * \frac{1}{Rdgen} * Rfb * G_{BE} =$$

$$S_{HP} * \frac{Vcc}{Rhp(epi)} * \frac{VRVAR}{Rvar(vepi)} * \frac{Rconst(epi)}{VRCONST} * \frac{1}{Rdgen(rppgp)} *$$

$$Rfb(rppgp) * G_{BE} = S_{HP} * \frac{Vcc}{Rhp(epi)} * \frac{Iptat5u(rgp) * Rref1(rgp)}{Rvar(vepi)} *$$

$$\frac{Rconst(epi)}{(4*IBN5 - Iptat5u)*Rref2(rgp)} * \frac{Rfb(rppgp)}{Rdgen(rppgp)} * G_{BE}$$

Stress drift for an example IC package can be expressed as:

$$\frac{\Delta \text{Sensitivity}}{\text{Sensitivity}} = \frac{\Delta S_{HP}}{S_{HP}} - \frac{\Delta R_{HP}}{S_{HP}} - \frac{\Delta R(vepi)}{R(vepi)} + \frac{\Delta R(epi)}{R(epi)},$$

where each term can be respectively expressed numerically for an example sensor embodiment as:

$$\frac{\Delta \text{Sensitivity}}{\text{Sensitivity}} = $$
$$45\%/GPa - (-24.4\%/GPa) - 53.4\%/GPa + (-24.4\%/GPa) = -8.4\%/GPa$$

It is understood that $$\frac{\Delta \text{Sensitivity}}{\text{Sensitivity}} = 45\%/GPa$$

is an example value based on example current driven Hall plate current sensor IC packages without Hall plate stress compensation with an average stress drift of about 1.2%. 24.4%/GPa corresponds to Hall plate changes, 53.4%/GPa refers to vertical epi resistor changes and 24.4%/GPa corresponds to lateral epi resistor changes.

An example embodiment of a voltage driven current sensor having Hall plate stress compensation as $$\frac{\Delta \text{Sensitivity}}{\text{Sensitivity}} = 8.4\%/GPa.$$

An example embodiment of a voltage driven current sensor having Hall plate has an overall sensitivity drift of about $$\frac{\Delta \text{Sensitivity}}{\text{Sensitivity}} = \frac{-8.4}{45} * 1.2\% = -0.23\%.$$

This stress drift is based on the assumption that Hall plate and stress compensation are the same die location, e.g., repi, rvepi resistors see the same pressure.

Current sensor sensitivity can be further expressed as:

$$\text{Sensitivity} = \frac{Vcc \cdot Rconst(epi)}{Rhp(epi)} \cdot \frac{S_{HP}}{Rvar(vepi)} \cdot \frac{iptat5u}{4*IBN5u - Iptat5u} \cdot$$
$$\frac{Rref1(rgp)}{Rref2(rgp)} \cdot \frac{Rfb(rppgp)}{Rdgen(rppgp)} \cdot G_{BE}$$

Elements in the above expression sensitive to package stress include $S_{HP}$, Rvar(vepi), and Rconst(epi).

In the illustrated circuit of FIG. 3, Gilbert cell (GC) gm:

$$gm = \frac{I_{gm\_out}}{Vhp} = \frac{1}{R_{dgen}} \cdot \frac{IVAR}{ICONST}$$

Current sensor sensitivity depends on Hall Plate current $I_{hall}=V_{CC}/R_{HP}$ where $R_{HP}$ is a lateral epi resistor and current sensor sensitivity is inversely proportional to $R_{HP}$ resistance. The $R_{HP}$ piezoresistive stress effect is compensated by another lateral epi resistor $R_{const(epi)}$ resistor forming $I_{const}$ Gilbert cell (GC) control current.

The Hall plate sensitivity piezo hall stress effect $S_{HP}$ is compensated by vertical epi resistor Rvar(vepi) that forms the $I_{var}$ control current. In embodiments, this compensation is not 100% with a residual stress sensitivity of −8.4%/GPa (see above) which is about 20% of the package stress sensitivity of the current driven Hall plate without stress compensation with negative sign. This value is comparable with current driven Hall plates with stress compensation. For comparison, an example voltage driven Hall plate current sensor embodiment without stress compensation has a sensitivity stress drift of about 69.4%/GPa.

In embodiments, parts of the sensitivity expression include compensation of the temperature coefficient used signal path configurations. Resistor $R_{const(epi)}$ compensates for the thermal coefficient (TC) of the Hall Plate resistance $R_{HP}$, both which are lateral n-epi resistors. In embodiments, element $$\frac{S_{HP}}{R_{var(vepi)}}$$

can compensate across temperature by element $$\frac{I_{ptat}}{4 \cdot I_{BN} - I_{ptat}},$$

where $I_{BN}$ is temperature flat current $$\left(I_{BN} \sim \frac{V_{BG}}{R}\right),$$

and $I_{PTAT}$ is positive TC current of the Bandgap core $$\left(I_{PTAT} \sim \frac{V_T}{R} = \frac{k \cdot T}{q \cdot R}\right)$$

In embodiments, $R_{ref1}$ and $R_{ref2}$ are resistors of the same type that are matched to guarantee the same temperature. In embodiments, the Gilbert cell degeneration resistor $R_{dgen}$ is the same type of resistor as the feedback resistors $R_{fb}$ for the transimpedance amplifier 308. In embodiments, resistors $R_{dgen}$ and $R_{fb}$ are matched to achieve the same temperature.

Figure 4:
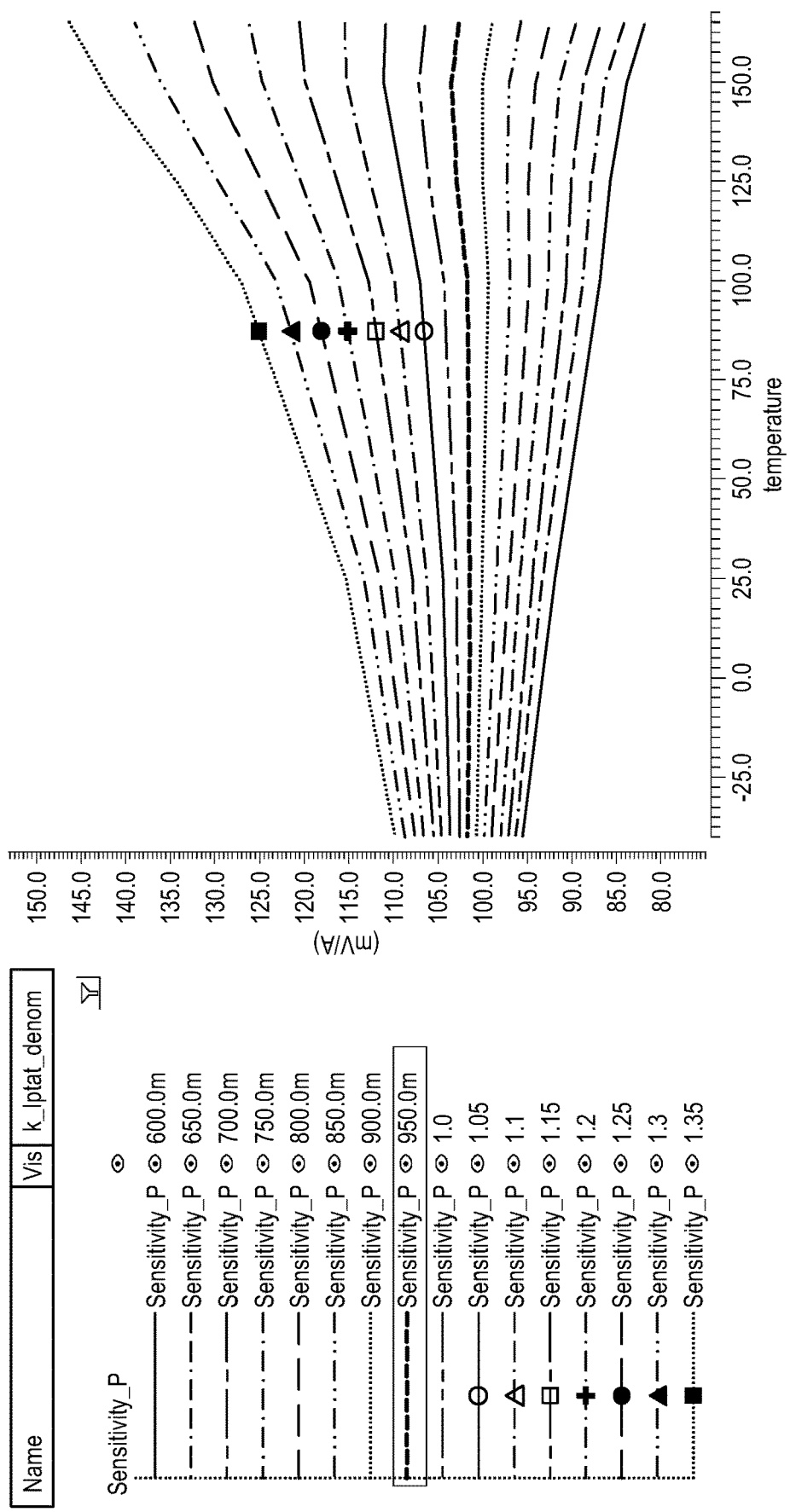
FIG. 4 is a graphical representation of sensitivity over temperature for an example voltage driven current sensor having stress compensation in accordance with example embodiments of the disclosure.

In embodiments, coarse thermal coefficient trimming can be implemented by adjustment of the sensitivity Temperature Coefficient in the Gilbert cell 308 by modifying sensitivity formula element $$\frac{I_{ptat}}{4 \cdot I_{BN} - I_{ptat}} \text{ to } \frac{I_{ptat}}{4 \cdot I_{BN} - k_{Iptat\_demon} \cdot I_{ptat}},$$

where $k_{Itat\_denom}$ is used for coarse signal path Sensitivity TC trimming, which should be roughly flat to have good dynamic conditions in the signal path. FIG. 4 shows plots for example values of $k_{Iptat\_denom}$ with one substantially flat value emphasized in the figure.

Fine TC trimming can be implemented on the $I_{VAR}$ current by scaling by sensf_trim into the DAC 316 based on a segment processor calculation using, for example, an internal temperature sensor measurement (not shown).

Figure 5A:
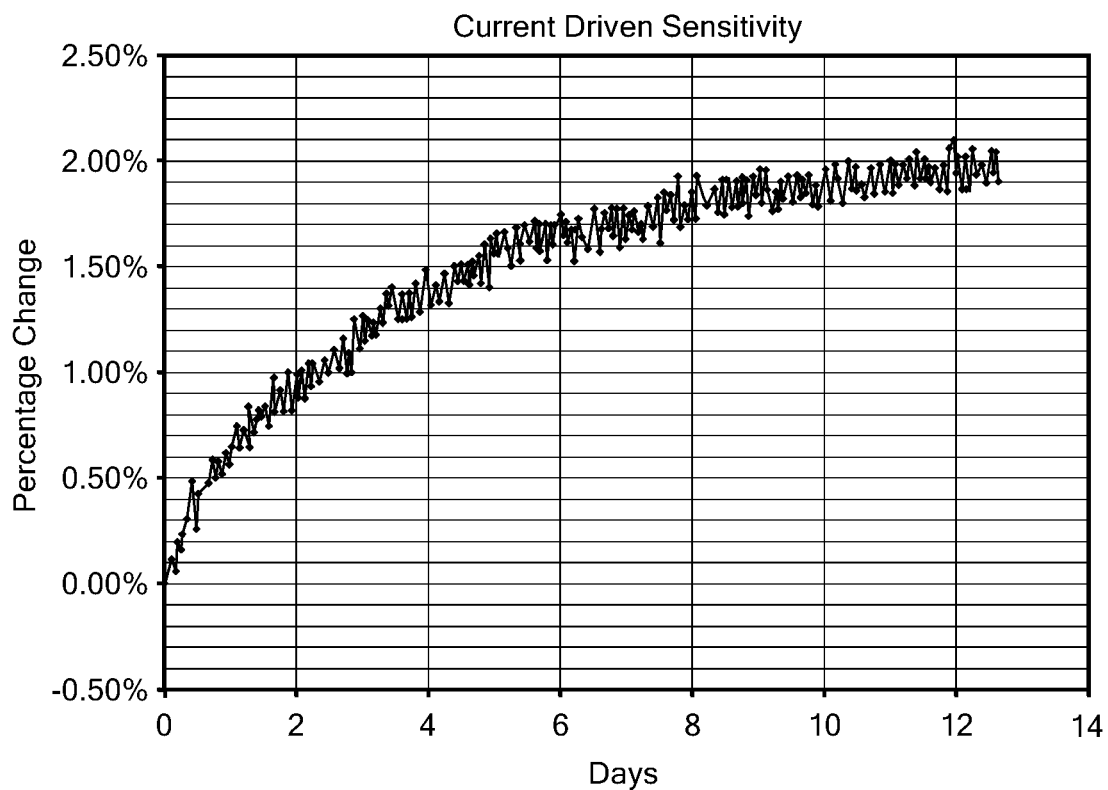
FIG. 5A shows Hall plate sensitivity for a current driven Hall plate and FIG. 5B shows Hall plate sensitivity for a voltage-drive Hall plate.
Figure 5B:
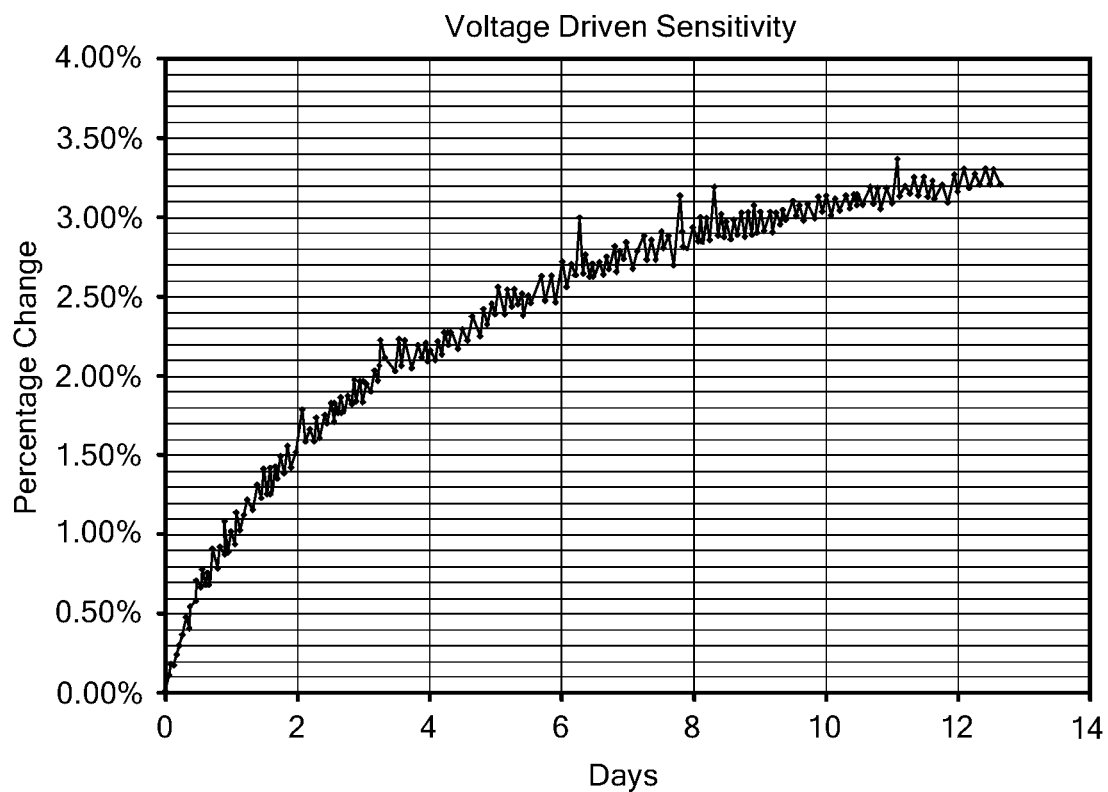
Figure 6A:
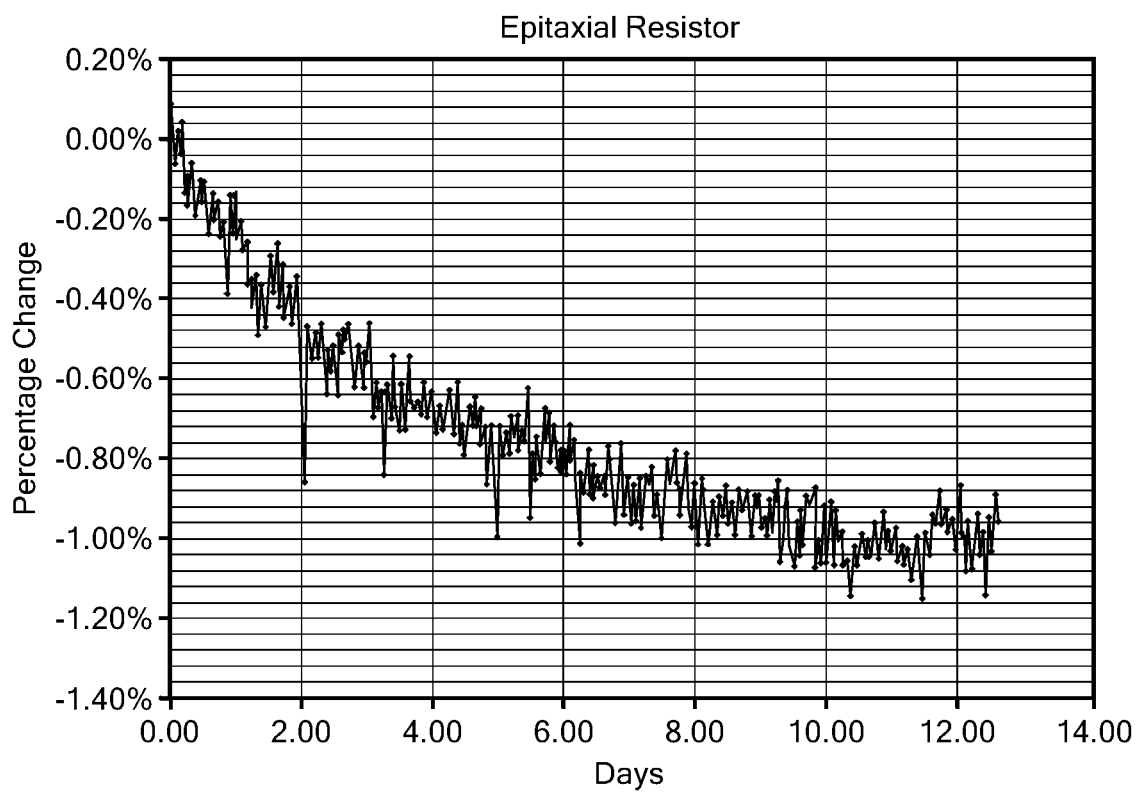
FIG. 6A shows the effect of stress on a lateral epitaxial resistor and FIG. 6B shows the effect of stress on a vertical epi resistor.
Figure 6B:
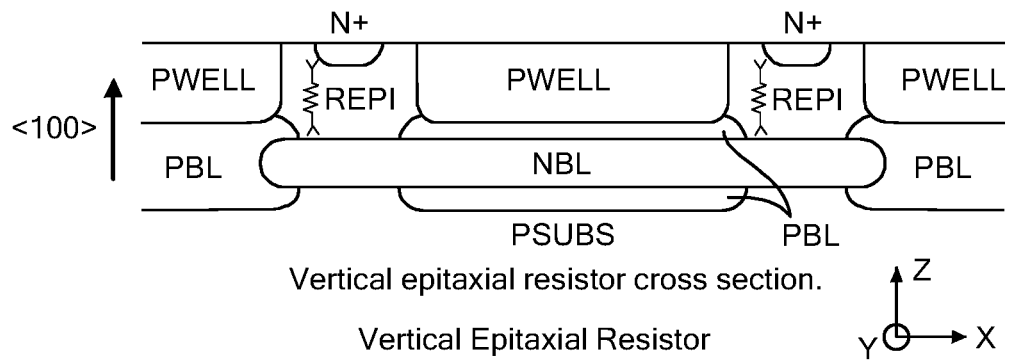
Figure 6B:
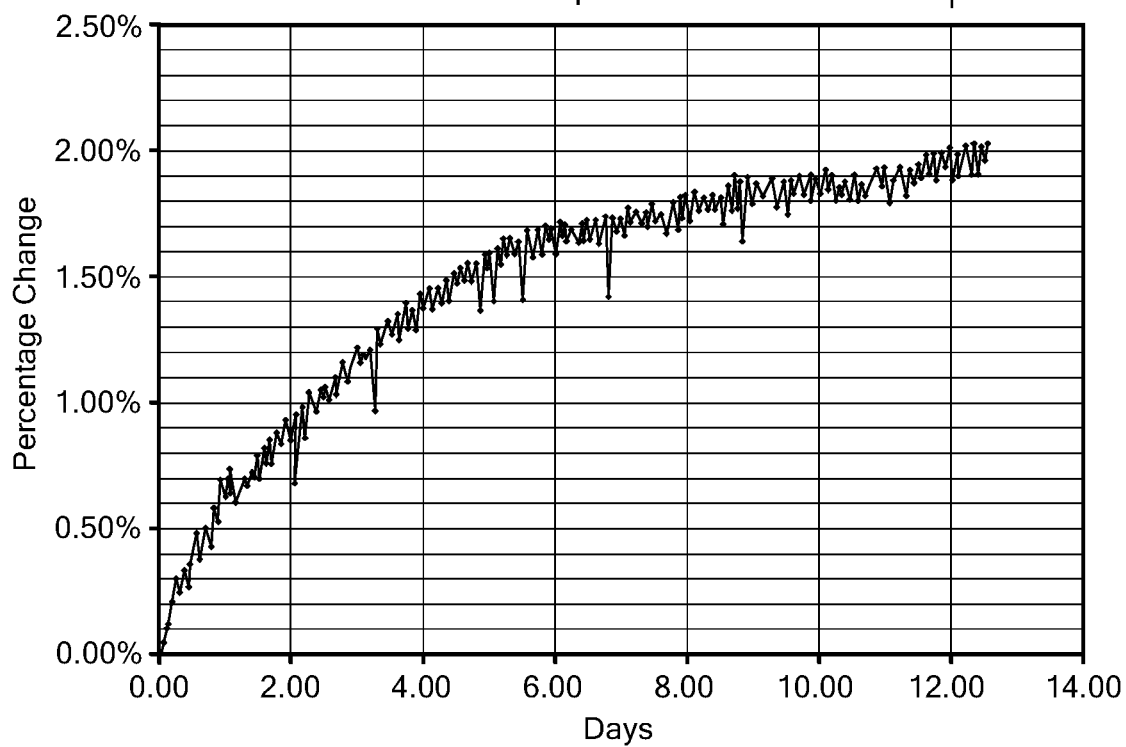

FIG. 5A shows the effect of stress on a Hall plate sensitivity for a current driven Hall plate and FIG. 5B shows the effect of stress on a Hall plate sensitivity for a voltage-drive Hall plate. FIG. 6A shows the effect of stress on a lateral epitaxial resistor and FIG. 6B shows the effect of stress on a vertical epi resistor.

So-called epi resistors, lateral and vertical, are well known in the art of Hall plate sensors. Example epi resistors are shown and described for example, in U.S. Pat. Nos. 10,254,354, and 10,636,285, and 10,520,559, and 10,746,818, and U.S. Patent Publication No. 2021/0048353, all of which are incorporated herein by reference.

Example embodiments of a voltage drive Hall plate sensor have lower noise than conventional current driven sensors while working at full $V_{cc}$ to achieve more than 3× lower noise at room temperature. In addition, voltage driven Hall plate sensors can save significant die area since no die area is needed for current source driving elements in current driven mode for the Hall plate.

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall effect elements tend to have axes of sensitivity perpendicular to a substrate, while metal based or metallic magnetoresistance elements (e.g., GMR, TMR, AMR) and vertical Hall effect elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of elements can refer to either a direct or an indirect coupling, and a positional relationship between entities can be a direct or indirect positional relationship. As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Relative or positional terms including, but not limited to, the terms "upper," "lower," "right," "left," "vertical," "horizontal," "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

The terms "one or more" and "at least one" indicate any integer number greater than or equal to one, i.e., one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A voltage driven Hall plate current sensor integrated circuit (IC) package, comprising:
    a die including a Hall plate comprising a Hall lateral epi resistor;
    a gm amplifier to receive an output voltage from the Hall plate;
    a front end amplifier to receive an output of the gm amplifier;
    compensation circuit to compensate for stress on the die that affects a resistance of the Hall plate, the compensation circuit including a compensation lateral epi resistor coupled to a temperature-dependent current for compensating for piezoresistive stress in the Hall plate, wherein the compensation lateral epi resistor is coupled to the gm amplifier;
    a bandgap circuit to generate the temperature-dependent current for the compensation lateral epi resistor; and
    a vertical epi resistor coupled to a variable current source corresponding to a temperature sensitivity value, wherein the vertical epi resistor is configured to compensate for piezo stress sensitivity of the Hall plate.

2. The IC package according to claim 1, wherein the gm amplifier comprises a Gilbert cell.

3. The IC package according to claim 2, further including a degeneration resistor coupled to terminals of the Gilbert cell.

4. The IC package according to claim 1, further including a digital-to-analog converter (DAC) to receive and output the temperature sensitivity value.

5. The IC package according to claim 4, wherein the DAC is coupled to a temperature dependent current.

6. The IC package according to claim 1, wherein the vertical epi resistor is coupled to the gm amplifier.

7. The IC package according to claim 1, further including a back end amplifier coupled to an output of the front end amplifier.

8. A method, comprising:
    employing a die including a Hall plate comprising a Hall lateral epi resistor, wherein the die forms a part of a voltage driven Hall plate current sensor integrated circuit (IC) package;
    connecting a gm amplifier to receive an output voltage from the Hall plate;
    connecting a front end amplifier to receive an output of the gm amplifier;
    configuring a compensation circuit to compensate for stress on the die that affects a resistance of the Hall plate, wherein the compensation circuit includes a compensation lateral epi resistor coupled to a first temperature dependent current source for compensating for piezoresistive stress in the Hall plate, wherein the compensation lateral epi resistor is coupled to the gm amplifier;
    configuring a bandgap circuit to generate the first temperature dependent current source for the compensation lateral epi resistor; and
    coupling a vertical epi resistor to a second temperature dependent current source corresponding to a temperature sensitivity value, wherein the vertical epi resistor is configured to compensate for piezo stress sensitivity of the Hall plate.

9. The method according to claim 8, wherein the gm amplifier comprises a Gilbert cell.

10. The method according to claim 9, further including a degeneration resistor coupled to terminals of the Gilbert cell.

11. The method according to claim 8, further including connecting a digital-to-analog converter (DAC) to receive and output the temperature sensitivity value.

12. The method according to claim 11, wherein the DAC is coupled to a third temperature dependent current.

13. The method according to claim 8, wherein the vertical epi resistor is coupled to the gm amplifier.

14. The method according to claim 8, further including connecting a back end amplifier coupled to an output of the front end amplifier.

15. A voltage driven Hall plate current sensor integrated circuit (IC) package, comprising:
    a die including a Hall plate comprising a lateral epi resistor;
    a Gilbert cell including a gm amplifier having inputs to receive a differential output voltage from the Hall plate, a degeneration resistor coupled to terminals of the gm amplifier;
    a front end amplifier to receive an output of the gm amplifier, wherein first and second feedback resistor are coupled in a feedback configuration for first and second inputs of the front end amplifier;
    a compensation circuit comprising:
        a lateral epi resistor RCONST coupled to the gm amplifier via a second current generator active device and to a temperature dependent current ICONST for compensating for piezoresistive stress in the Hall plate;
        a vertical epi resistor RVAR coupled to the gm amplifier via a first current generator active device and to a DAC configured to receive a temperature sensitivity value;
        a first reference resistor connected to the first current generator active device via a first amplifier and configured to receive a bandgap temperature dependent current from a bandgap circuit; and
        a first reference resistor connected to the DAC and to a current source configured to provide a DAC temperature dependent current, wherein an output of the DAC is coupled to the vertical epi resistor RVAR via a first amplifier.

16. The IC package according to claim 15, wherein the first and second reference resistors are matched for a same temperature.

17. The IC package according to claim 15, wherein the degeneration resistor and the first and second feedback resistors are a same type.

18. The IC package according to claim 15, wherein the degeneration resistor and the first and second feedback resistors are matched to achieve a same temperature.

19. The IC package according to claim 15, further including a bandgap circuit to provide the temperature dependent current to the DAC.

20. The IC package according to claim 15, wherein a temperature coefficient of the Gilbert cell is trimmed using a constant $k_{Iptat\_denom}$ for coarse signal path trimming.

21. The IC package according to claim 20, wherein the temperature coefficient of the Gilbert cell is finely trimmed by the temperature sensitivity value at the input of the DAC.

* * * * *